United States Patent [19]

Sezaki et al.

[11] Patent Number: 4,728,692

[45] Date of Patent: Mar. 1, 1988

[54] THERMOPLASTIC ELASTOMER COMPOSITION

[76] Inventors: Eiji Sezaki, 17-21, Okamura 4-chome, Isogo-ku, Yokohama-shi, Kanagawa-ken; Takashi Mikami, 23-48, Izumihon-cho 3-chome, Komae-shi, Tokyo; Tsuyoshi Kanai, 2253-61, Kamariya-cho, Kanazawa-ku, Yokohama-shi, Kanagawa-ken; Toshio Yoshida, 8-18, Minamina-gata 2-chome, Minami-ku, Yokohama-shi, Kanagawa-ken; Kikuo Tanaka, 17-40, Asahi-cho 3-chome, Kawagoe-shi, Saitama-ken; Masaaki Saito, 1877-22, Totsuka-cho, Totsuka-ku, Yokohama-shi, Kanagawa-ken, all of Japan

[21] Appl. No.: 19,553

[22] PCT Filed: Jun. 16, 1986

[86] PCT No.: PCT/US86/01306

§ 371 Date: Feb. 18, 1987

§ 102(e) Date: Feb. 18, 1987

[87] PCT Pub. No.: WO86/07600

PCT Pub. Date: Dec. 31, 1986

[30] Foreign Application Priority Data

Jun. 19, 1985 [JP] Japan ................................ 60-131670
Jun. 19, 1985 [JP] Japan ................................ 60-131671

[51] Int. Cl.$^4$ .............. C08L 23/26; C08L 9/02; C08L 15/02; C08L 51/06

[52] U.S. Cl. ........................ 525/74; 525/192; 525/196; 525/232; 525/233; 525/78; 525/193; 525/197; 525/211; 524/504; 524/572

[58] Field of Search ................ 525/192, 196, 74, 78, 525/232, 233

[56] References Cited

U.S. PATENT DOCUMENTS

| | | | |
|---|---|---|---|
| 3,904,470 | 9/1975 | Fukuki et al. | 525/240 |
| 4,048,261 | 9/1977 | Stramer | 525/187 |
| 4,130,534 | 12/1978 | Coran et al. | 525/232 |
| 4,299,931 | 11/1981 | Coran et al. | 525/95 |
| 4,409,365 | 10/1983 | Coran et al. | 525/78 |

FOREIGN PATENT DOCUMENTS 56-159239 12/1981 Japan .

*Primary Examiner*—Carman J. Seccuro

[57] ABSTRACT

A thermoplastic elastomer composition and process comprising a crystalline polyolefin, halogenated butyl rubber, olefin copolymer rubber, polyolefin modified with, e.g., maleic anhydride, and, optionally nitrile rubber, wherein the halogenated butyl rubber is at least partially crosslinked using a metal oxide and/or chloride, e.g., zinc oxide. Crosslinking is achieved under dynamic mixing conditions and the resulting composition has superior strength, performance and processing properties. Furthermore, use of nitrile rubber imparts improved oil resistance to the composition.

24 Claims, No Drawings

THERMOPLASTIC ELASTOMER COMPOSITION

The present invention relates to a thermoplastic elastomer composition.

There are known thermoplastic elastomer compositions which are formed by partially crosslinking a composition composed of a polyolefin and a rubber component in the presence of a crosslinking agent. The crosslinking agent used in the production of these compositions is mainly an organic peroxide, sulfur, or a vulcanization accelerator for sulfur-cured rubber.

The crosslinking agent of organic peroxide has some disadvantages. It is so reactive that it is difficult to properly control the degree of crosslinking. It brings about the scission of molecules simultaneously with crosslinking, deteriorating the properties of a composition or increasing the melt index of a polyolefin. This in turn adversely affects the drawdown of the melt at the time of molding and causes the surface roughening of the moldings due to partial gelling. In addition, free radicals induced by an organic peroxide remain in the moldings to aggravate the thermal stability of the moldings. On the other hand, a crosslinking of sulfur forms the S-S linkage which adversely affects the thermal stability.

There is proposed in, for example, Japanese Patent Publication No. 23702/1979 a partially crosslinked thermoplastic elastomer composition which comprises (A) 5 to 40 wt% of polyisobutylene and/or butyl rubber, (B) 30 to 90 wt% of ethylene-propylene copolymer rubber and/or ethylene-propylene-non-conjugated diene terpolymer rubber, and (C) 5 to 40 wt% of polyolefin resin. The crosslinking agent used in this composition is substantially an organic peroxide, and the crosslinking of the composition takes place mainly in component (B). Therefore, the miscibility of the components and the oil resistance were less than perfect.

It is an object of the present invention to provide a partially crosslinked composition containing a polyolefin such as polypropylene and an olefin copolymer rubber such as ethylene-propylene copolymer rubber as well as other polymeric components. The composition is a thermoplastic elastomer composition superior in moldability, heat resistance, miscibility, and where nitrile rubber is included in the composition, oil resistance, in which there is no molecular scission and the olefin copolymer rubber is not substantially crosslinked. The present inventors conducted a series of experiments which led to the finding that when a composition of polyolefin such as polypropylene, olefin copolymer rubber, modified polyolefin, halogenated butyl rubber and optionally, nitrile rubber, is subjected to crosslinking with a crosslinking agent of a metal oxide and/or a metal chloride, the halogenated butyl rubber alone is selectively cross-linked.

SUMMARY OF THE INVENTION

A thermoplastic elastomer composition and process comprising (A) 10 to 90 parts by weight of crystalline polyolefin such as polypropylene, (B) 10 to 90 parts by weight of halogenated butyl rubber (with the total amount of (A) and (B) being 100 parts by weight), (C) 10 to 120 parts by weight of olefin copolymer rubber, (D) 1 to 90 parts by weight of modified polyolefin, and optionally (E) 2 to 50 parts by weight of nitrile rubber, said composition being partially crosslinked in the presence of a crosslinking agent of a metal oxide and/or a metal chloride.

DETAILED DESCRIPTION OF THE INVENTION

Components of the Composition (A) Crystalline Polyolefin

This component comprises a homopolymer of propylene or a copolymer of propylene with an alpha-olefin such as ethylene, 1-butene, 1-hexene, and 4-methyl-1-pentene. It has a melt flow rate (abbreviated as MFR hereinafter) of 0.3 to 60 g/10 min, preferably 1 to 40 g/10 min, and more preferably 3 to 30 g/10 min. (This component is designated as component A hereinafter.)

Component A has the highest melting point among polyolefins; and it contributes to an improvement in heat resistance and mechanical strength.

(B) Halogenated Butyl Rubber

This component denotes a halogenated isobutylene-isoprene copolymer rubber. (It is designated as component B hereinafter.) Examples of the halogen include chlorine and bromine. The content of halogen is usually 0.5 to 4.0 wt%. Component B should preferably have a Mooney viscosity of 30 to 100 ML 1+8 (100° C.) and a degree of unsaturation of 0.5 to 4.0 mol%.

Component B is a rubber capable of crosslinking with a metal oxide or metal chloride. It is dispersed in the form of crosslinked rubber in the composition. It imparts heat resistance, oil resistance, vibration absorption, gas impermeability, and slip resistance to the composition.

(C) Olefin Copolymer Rubber

This component includes copolymer rubbers each composed of two or more monoolefins such as ethylene, propylene, 1-butene, 1-hexene, and 4-methyl-1-pentene (typically ethylene-propylene copolymer rubber) and copolymer rubbers each composed of two of the above-mentioned monoolefins (preferably ethylene and propylene) and a non-conjugated diolefin such as dicyclopentadiene, 1,4-hexadiene, cyclooctadiene, methylenenorbornene, and ethylidenenorbornene, or a conjugated diolefin such as butadiene and isoprene. (It is designated as component C hereinafter.) Component C should preferably have a Mooney viscosity of 5 to 300 ML 1+8 (127° C.), an iodine value up to 30, and an ethylene content of 35 to 85 wt%.

In the composition, component C is present in the form of non-crosslinked rubber. It imparts the molding flowability to the composition and works as a binder at the phase boundary between component A and component B. It also contributes to an improvement in tensile strength and elongation of the composition.

(D) Modified Polyolefin

This component includes those which are formed by adding an unsaturated carboxylic acid or a derivative thereof to a polyolefin. (It is designated as component D hereinafter.)

Examples of the polyolefin include homopolymers of alpha-olefin such as ethylene, propylene, 1-butene, 1-hexene, and 4-methyl-1-entene, and copolymers of ethylene with one or more alpha-olefins. Preferable among the polyolefins are low-density polyethylene, linear low-density polyethylene, medium- and high-density polyethylene, polypropylene, and propylene-ethylene random or block copolymers.

Examples of the unsaturated carboxylic acid include maleic acid, endo-bicyclo-[2.2.1]-5-heptene-2,3-dicarboxylic acid, itaconic acid, fumaric acid, acrylic acid, and methacrylic acid. Examples of their derivatives include acid anhydrides, acid amides, and esters.

The reaction of an unsaturated carboxylic acid or a derivative thereof with a polyolefin may be accomplished by any known method. For example, the reaction may be accomplished by adding a reaction initiator such as organic peroxide to a mixture of polyolefin and an unsaturated carboxylic acid or a derivative thereof, and then melt-mixing the resulting mixture. The amount of an unsaturated carboxylic acid or a derivative thereof to be added to a polyolfin should preferably be 0.02 to 2 wt%.

Component D may contain an olefin copolymer rubber such as the above-mentioned component C (which has a Mooney viscosity of 5 to 300 ML 1+8 (127° C.), an iodine value up to 30, and an ethylene content of 35 to 85 wt%.) or a polyisobutylene having a density of 0.91 to 0.93 g/cc and a molecular weight of 60,000 to 135,000 (measured according to Staudinger method). In the reaction of an unsaturated carboxylic acid or a derivative thereof with a mixture of polyolefin and olefin rubber, the mixture should preferably comprise 10 to 90 wt% of polyolefin, 90 to 10 wt% of olefin rubber, and the amount of acid should preferably be 0.02 to 2 wt%.

Component D functions as a binder which makes the individual components in the composition miscible with one another, and it also contributes to an improvement in mechanical strength of the composition.

(E) Nitrile Rubber

This means an acrylonitrile-butadiene copolymer rubber (referred to as component E hereinafter). The preferred nitrile rubber contains 20 to 50 wt% of acrylonitrile and has a Mooney viscosity of 15 to 150 ML 1+8 (100° C.).

Component E contributes to an improvement in the oil resistance of the composition.

(F) Crosslinking Agent

Examples of the metal oxide crosslinking agent include zinc oxide, magnesium oxide, lead oxide, and calcium oxide, with zinc oxide being preferable.

Examples of the metal chloride crosslinking agent include zinc chloride and tin chloride. It should preferably be used in combination with magnesium oxide to capture free halogen which otherwise corrodes the mold and the like.

The crosslinking agent should be used in an amount of 0.2 to 10 parts by weight, preferably 1 to 5 parts by weight, per 100 parts by weight of component A, component B, component C, component D, and when used, component E.

(G) Other Components

In order for the composition to be more flexibile, it may be incorrorated with a mineral oil softener in an amount of up to 150 parts by weight per 100 parts by weight in total of component A and component B. Examples of the softener include naphthenic, paraffinic, and aromatic rubber process oils and mineral oils which are high-boiling fractions of petroleum.

In addition, the composition may include, as required, stabilizers such as antioxidant, ultraviolet light absorber, and metal deactivator; additives such as slip agent, antistatic agent, electric property improver, flame retardant, processing aid, and pigment; and inorganic fillers such as talc, calcium carbonate, barium sulfate, mica, and calcium silicate.

Compounding Ratio

The compounding ratio of components A, B, C, D and E useful in this invention include:

Component A: 10 to 90 parts by weight, preferably 20 to 70 parts by weight. Component B: 10 to 90 parts by weight, preferably 30 to 80 parts by weight. (The amounts of components A and B are selected so that their total is 100 parts by weight.) Component C: 10 to 120 parts by weight, preferably 10 to 50 parts by weight. Component D: 1 to 90 parts by weight, preferably 5 to 50 parts by weight. Component E: 2 to 50 parts by weight, preferably 5 to 30 parts by weight.

With component A less than 210 parts by weight, the composition is poor in mechanical strength and heat resistance. On the other hand, with component A in excess of 90 parts by weight, the composition is poor in elastomeric properties due to high hardness and high compression set.

With component C less than 10 parts by weight, the composition is poor in flexibility and molding flowability, and also in miscibility of component A and component B. On the other hand, with component C in excess of 120 parts by weight, the composition has a low mechanical strength and a high compression set.

With component D less than 1 part by weight, the composition is poor in mechanical strength due to insufficient miscibility of individual components. On the other hand, if the amount of component D exceeds 90 parts by weight, its effect reaches a plateau and it is wasteful.

When component E is included if it is less than 2 parts by weight, the composition is not improved in oil resistance. On the other hand, with component E in excess of 50 parts by weight, the composition is poor in flowability.

Process For Producing the Composition

The composition of this invention is prepared by bringing components A, B, C, D, and, when used, E, and a crosslinking agent and other optional components into contact with one another in the molten state. According to a preferred method, the components excluding a crosslinking agent are melted and mixed preliminarily for 1 to 10 minutes, and then a crosslinking agent is added and mixing is continued for 1 to 30 minutes in the molten state. In the course of mixing, component B alone selectively undergoes crosslinking to give the composition which achieves the object of the invention.

The melting and mixing may be accomplished with a commonly used pressurized kneader, Banbury mixer, or screw extruder.

The composition of this invention is superior in mechanical strength, heat resistance, moldability, and oil resistance because the components thereof are highly miscible with one another. It is produced without using a difficult to control organic peroxide. The crosslinking agent used in this invention is so thermally stable that it is possible to control the degree of crosslinking as desired.

The composition of the invention has well-balanced flexibility, strength, and heat resistance, and also has good moldability; therefore, it is suitable as a raw material for auto parts such as, rack/pinion, boots, hoses, side moldings, spoilers, bumpers, and the like, which are readily molded by the conventional molding method such as blow molding, extrusion molding, and injection molding.

EXAMPLES

The invention is now described in more detail with reference to the following examples, in which parts and percent are based on weight. The test methods are as follows:

(1) MI: JIS K7210 (load 2.16 kg, 190° C.)
(2) MFR: JIS K7210 (load 2.16 kg, 230° C.)
(3) MLMFR: JIS K7210 (load 10 kg, 230° C.)
(4) Tensile strength at break and elongation: JIS K6301
(5) Hardness by spring type tester: JIS K6301, Type A
(6) Compression set: JIS K6301, 70° C.×22 hours, 25% compression
(7) Heat resistance: Expressed in terms of the ratio of the elongation (%) measured before heat aging to the elongation (%) measured after heat aging at 150° C. in an oven for 600 hours. 70% and higher is indicated by " ", 50% to less than 70% is indicated by "Δ", and less than 50% is indicated by "x".
(8) Moldability: Evaluated by the appearance of parison in blow molding. The one having a smooth, glossy surface and a minimum of drawdown is indicated by " ". The one having a slightly rough surface and a great drawdown is indicated by "Δ". The one having a severely rough surface and a great drawdown is indicated by "x".
(9) Oil resistance: JIS K6310. Rated according to swelling that takes place after immersion in s JIS No. 3 oil.  · : less than 50%,  : 50 to less than 100%, Δ: 100 to less than 200%, x: more than 200%.
(10) Degree of crosslinking: Calculated from the amount of insoluble matter that remains after refluxing in tetralin at 210° C. for 3 hours. The insoluble matter was examined for composition by infrared spectrometry.

Examples 1 to 12 and Comparative Examples 1 to 5

Materials Used

Component A: Propylene-ethylene block copolymer (density: 0.90 g/cc, MFR: 3.0 g/10 min, and ethylene content: 7%. Referred to as "PP block" hereinafter).

Component B: Chlorinated isobutylene-isoprene copolymer rubber (Mooney viscosity: 50 ML 1+8 (100° C.), chlorine content: 1%, and degree of unsaturation: 2 mol%. Referred to as "ClIIR" hereinafter.) Isobutylene-isoprene copolymer rubber (Exxon Butyl 268, a product of Exxon Chemical Company, referred to as "IIR" hereinafter.)

Component C: Ethylene-propylene-ethylidenenorbornene copolymer rubber (Mooney viscosity: 230 ML 1+8 (127° C.), iodine value: 18, and ethylene content: 60%. Referred to as "EPDM" hereinafter.) Ethylene-propylene rubber (Mooney viscosity: 25 ML 1+8 (127° C.), and ethylene content: 40%. Referred to as "EPM" hereinafter.)

Component D: PP block (MFR: 10 g/10 min, ethylene content: 7%) modified with endobicyclo-[2.2.1]-5-heptene-2,3-dicarboxylic anhydride (amount of the acid added: 0.3%, referred to a "CMPP" hereinafter.) High-density polyethylene (density: 0.950 g/cc, MI: 10 g/10 min, referred to as "HDPE" hereinafter.) modified with maleic anhydride (referred to as "MA") (amount of the acid added: 0.3%, referred to as "CMHDPE" hereinafter.) Linear low-density polyethylene (density: 0.925 g/cc, MI: 5 g/10 min, referred to as "LLDPE" hereinafter) modified with MA (amount of the acid added: 0.3%, referred to as "CMLLDPE" hereinafter.) A mixture of 90% of LLDPE (density: 0.925 g/cc, MI: 10 g/10 min) and 10% of polyisobutylene (density: 0.92 g/cc and molecular weight: 100,000, referred to as PIB hereinafter) modified with MA (amount of the acid: 0.3%, referred to as CMPE 90 CMPIB 10). A mixture of 10% of HDPE (density: 0.950 g/cc, MI: 8.0 g/10 min) and 90% of EPM (Mooney viscosity: 25 ML 1+8 (127° C.), and ethylene content: 70%.) modified with MA (amount of the acid: 0.3%, referred to as CMPD 10 CMEPM 90).

Component E: Zinc oxide, zinc chloride, 2,5-di-(t-butylperoxy)-hexyne-3 (crosslinking agent, referred to as "P.O" hereinafter), and magnesium oxide (halogen capturing agent).

Component F: Napthenic and paraffinic mixed process oil (referred to as "softener" hereinafter), and talc (having an average particle diameter of 4 μm).

Production of Composition

The above-mentioned components, except component E (crosslinking agent) were mixed in the ratio shown in Table 1. The mixture was melted and kneaded preliminarily at 160° C. for 1 to 5 minutes. The crosslinking agent and crosslinking auxiliaries were added, and kneading was continued at 175° C. for 3 to 5 minutes. The resulting mix was formed into a sheet and the sheet was cut into pellets. The pellets thus produced were molded into test pieces. Table 1 shows the characteristic properties of each composition.

The composition in Example 5 was examined for the degree of crosslinking. The amount of insoluble matter (excluding talc) was 13.0%, and the infrared absorption spectrum indicated that crosslinking took place only in component B.

TABLE 1

|  | Example | | | | | | | |
|---|---|---|---|---|---|---|---|---|
|  | 1 | 2 | 3 | 4 | 5 | 6 | 7 | 8 |
| PP block (parts) | 50 | 10 | 27 | 33 | 55 | 75 | 27 | 55 |
| ClIIR (parts) | 50 | 90 | 73 | 67 | 45 | 25 | 73 | 45 |
| EPDM (parts) | — | 50 | — | 33 | 90 | — | 10 | 10 |
| EPM (parts) | 80 | — | 10 | — | — | 10 | — | — |
| Softener (parts) | — | 40 | 27 | 25 | 80 | 6 | 27 | 80 |
| Modified polyolefin (parts) | CMPP | CMPP | CMEPM90 CMPE10 | CMPP | CMEPM90 CMPE10 | CMEPM90 CMPE10 | CMPIB10 CMPE90 | CMEPM90 CMPE10 |
|  | 10 | 50 | 35 | 21 | 10 | 10 | 36 | 90 |
| Talc (parts) | — | 20 | 15 | 13 | 22 | 4 | 15 | 22 |
| ZnO (parts) | 2.0 | 2.0 | 2.0 | 2.0 | 2.0 | 1.0 | 2.0 | 2.0 |
| ZnCl (parts) | — | — | — | — | — | — | — | — |
| MgO (parts) | 2.0 | 2.0 | 2.0 | 2.0 | 2.0 | 1.0 | 2.0 | 2.0 |
| P.O (parts) | — | — | — | — | — | — | — | — |
| MFR (g/10 min) | 0.1 | 0.001 | 0.002 | 0.01 | 0.01 | 7.0 | 0.01 | 0.05 |
| MLMFR (g/10 min) | 20 | 0.15 | 0.41 | 2.0 | 2.0 | — | 0.9 | 15 |
| Tensile strength at break (kg/cm$^2$) | 100 | 55 | 51 | 70 | 55 | 150 | 74 | 62 |
| Tensile elongation | 700 | 410 | 440 | 550 | 720 | 360 | 440 | 750 |

TABLE 1-continued

|  | Example | | | | | Comparative Example | | | |
| --- | --- | --- | --- | --- | --- | --- | --- | --- | --- |
|  | 9 | 10 | 11 | 12 | 1 | 2 | 3 | 4 | 5 |
| at break (%) | | | | | | | | | |
| Spring hardness | 85 | 70 | 69 | 75 | 65 | 95 | 79 | 65 | |
| Compression set (%) | 30 | 25 | 15 | 28 | 50 | 78 | 40 | 35 | |
| Heat resistance | | | | | | | | | |
| Moldability | | | | | | | | | |
| PP block (parts) | 33 | 55 | 33 | 33 | 55 | 50 | 75 | 33 | 20 |
| ClIIR (parts) | 67 | 45 | 67 | 67 | 45 | 50 | 25 | 67 | IIR 33 |
| EPDM (parts) | 33 | 50 | 33 | 33 | 122 | 25 | 9 | 33 | 47 |
| EPM (parts) | — | — | — | — | — | — | — | — | — |
| Softener (parts) | 25 | 80 | 25 | 25 | 92 | 17 | 6 | 25 | — |
| Modified polyolefin (parts) | CMHDPE 15 | CMEPM90 CMPE10 50 | CMLLDPE 15 | CMLLDPE 15 | — | — | — | — | — |
| Talc (parts) | 13 | 22 | 13 | 13 | 22 | 10 | 4 | 13 | — |
| ZnO (parts) | 2.0 | 2.0 | 2.0 | — | 2.0 | 2.0 | 1.0 | — | — |
| ZnCl (parts) | — | — | — | 2.0 | — | — | — | — | — |
| MgO (parts) | 2.0 | 2.0 | 2.0 | 2.0 | 2.0 | 2.0 | 1.0 | — | — |
| P.O (parts) | — | — | — | — | — | — | — | 1.0 | 1.0 |
| MFR (g/10 min) | 0.01 | 0.04 | 0.01 | 0.01 | 0.01 | 0.03 | 8 | 4 | 0.3 |
| MLMFR (g/10 min) | 2.5 | 13 | 2.5 | 2.5 | 8 | 3 | 40 | — | — |
| Tensile strength at break (kg/cm$^2$) | 70 | 60 | 70 | 70 | 44 | 72 | 120 | 38 | 48 |
| Tensile elongation at break (%) | 550 | 730 | 570 | 570 | 650 | 560 | 300 | 400 | 220 |
| Spring hardness | 72 | 64 | 70 | 70 | 58 | 86 | 95 | 60 | 73 |
| Compression set (%) | 30 | 42 | 30 | 30 | 62 | 65 | 85 | 70 | 46 |
| Heat resistance | | | | | | | | x | x |
| Moldability | | | | | | | | x | x |

Examples 13 to 18 and Comparative Examples 6 to 9

Materials Used

Component A: Propylene-ethylene block copolymer (density: 0.90 g/cc, MFR: 3.0 g/10 min, and ethylene content: 7%. Referred to as "PP block" hereinafter).

Component B: Chlorinated isobutylene-isoprene copolymer rubber (Mooney viscosity: 50 ML 1+8 (100° C.), chlorine content: 1%, and degree of unsaturation: 2 mol%. Referred to as "ClIIR" hereinafter.)

Component C: Ethylene-propylene-ethylidenenorbornen copolymer rubber (Mooney viscosity: 230 ML 1+8 (127° C.), iodine value: 18, and ethylene content: 60%. Referred to as "EPDM" hereinafter.) Ethylene-propylene rubber (Mooney viscosity: 25 ML 1+8 (127° C.), and ethylene content: 40%. Referred to as "EPM" hereinafter.)

Component D: PP block (MFR: 10 g/10 min, ethylene content: 7%) modified with endobicyclo-[2.2.1]-5-heptene-2,3-dicarboxylic anhydride (amount of the acid added: 0.3%, referred to as "CMPP" hereinafter.) A mixture of 10% of HDPE (density: 0.950 g/cc, MI: 8.0 g/10 min) and 90% of EPM (Mooney viscosity: 25 ML 1+8 (127° C.), and ethylene content: 70%.) modified with maleic anhydride (amount of the acid: 0.3%, referred to as CMPE 10 CMEPM 90).

Component E: Acrylonitrile-butadiene copolymer rubber (having a Mooney viscosity of 56 ML 1+8 (100° C.) and containing 35% of acrylonitrile, referred to as NBR hereinafter).

Component F: Zinc oxide, zinc chloride, 2,5-di-(t-butylperoxy)-hexyne-3 (crosslinking agent, referred to as "P.o" hereinafter), and magnesium oxide (halogen capturing agent).

Component G: Naphthenic and paraffinic mixed process oil (referred to as "softener" hereinafter), and talc (having an average particle diameter of 4 μm).

Production of Composition

The above-mentioned components, except component F (crosslinking agent) were mixed in the ratio shown in Table 2. The mixture was melted and kneaded preliminarily at 160° C. for 1 to 5 minutes. The crosslinking agent and crosslinking auxiliaries were added, and kneading was continued at 175° C. for 3 to 5 minutes. The resulting mix was formed into a sheet and the sheet was cut into pellets. The pellets thus produced were molded into test pieces. Table 2 shows the characteristic properties of each composition. The composition in Example 17 was examined for the degree of crosslinking. The amount of insoluble matter (excluding talc) was 13.0%, and the infrared absorption spectrum indicated that crosslinking took place only in component B.

TABLE 2

|  | Example | | | | | | Comparative Example | | | |
| --- | --- | --- | --- | --- | --- | --- | --- | --- | --- | --- |
|  | 13 | 14 | 15 | 16 | 17 | 18 | 6 | 7 | 8 | 9 |
| PP block (parts) | 55 | 55 | 33 | 27 | 55 | 50 | 55 | 27 | 33 | 33 |
| ClIIR (parts) | 45 | 45 | 67 | 73 | 45 | 50 | 45 | 73 | 67 | 67 |
| EPDM (parts) | 10 | 40 | 23 | — | 80 | — | 10 | — | 33 | 33 |
| EPM (parts) | — | — | — | 10 | — | 80 | — | 10 | — | — |
| Softener (parts) | 80 | 80 | 25 | 27 | 80 | — | 80 | 27 | 25 | 25 |
| Modified polyolefin (parts) | CMEPM90 CMPE10 50 | CMEPM90 CMPE10 50 | CMPP 21 | CMEPM90 CMPE10 25 | CMEPM90 CMPE10 10 | CMEPM90 CMPE10 10 | CMEPM90 CMPE10 90 | CMPP 35 | CMEPM90 CMPE10 21 | — |
| NBR (parts) | 40 | 10 | 10 | 10 | 10 | 10 | — | — | — | — |
| ZnO (parts) | 2.0 | 2.0 | 2.0 | 2.0 | 2.0 | 2.0 | 2.0 | 2.0 | 2.0 | — |
| ZnCl (parts) | — | — | — | — | — | — | — | — | — | — |

TABLE 2-continued

|  | Example | | | | | | Comparative Example | | | |
| --- | --- | --- | --- | --- | --- | --- | --- | --- | --- | --- |
|  | 13 | 14 | 15 | 16 | 17 | 18 | 6 | 7 | 8 | 9 |
| MgO (parts) | 2.0 | 2.0 | 2.0 | 2.0 | 2.0 | 2.0 | 2.0 | 2.0 | 2.0 | — |
| P.O (parts) | — | — | — | — | — | — | — | — | — | 1.0 |
| Talc (parts) | 22 | 22 | 13 | 15 | 22 | — | 22 | 15 | 13 | — |
| MFR (g/10 min) | 0.02 | 0.03 | 0.01 | 0.01 | 0.01 | 0.1 | 0.05 | 0.002 | 0.01 | 4 |
| MLMFR (g/10 min) | 10 | 15 | 2.0 | 1.0 | 2.0 | 15 | 15 | 0.41 | 2.0 | — |
| Tensile strength at break (kg/cm$^2$) | 37 | 51 | 55 | 48 | 50 | 85 | 62 | 51 | 70 | 38 |
| Tensile elongation at break (%) | 180 | 300 | 350 | 350 | 400 | 300 | 750 | 440 | 550 | 400 |
| Spring hardness | 75 | 73 | 75 | 72 | 70 | 85 | 65 | 69 | 75 | 60 |
| Compression set (%) | 37 | 36 | 30 | 16 | 40 | 45 | 35 | 15 | 28 | 70 |
| Heat resistance | ○ | ○ | ○ | ⊙ | ○ | ○ |  |  |  | x |
| Moldability | ○ | ○ | ○ | ○ | ○ | ○ |  |  |  | x |
| Oil resistance | ⊙ | ⊙ | ⊙ | ⊙ | ⊙ | ⊙ | x | x | x | x |

We claim:

1. A thermoplstic elastomer composition comprising (A) 10 to 90 parts by weight of crystalline polyolefin, (B) 10 to 90 parts by weight of halogenated butyl rubber, with the total amount of (A) and (B) being 100 parts by weight, (C) 10 to 120 parts by weight of olefin copolymer rubber composed of two or more monoolefins or two or more monoolefins and a non-conjugated diene, and (D) 1 to 90 parts by weight of modified polyolefin formed by reaction with an unsaturated carboxylic acid or a derivative thereof and optionally (E) 2 to 50 parts by weight of nitrile rubber, said composition being at least partially crosslinked in the presence of a crosslinking agent of a metal oxide and/or a metal chloride.

2. The composition of claim 1 wherein said halogenated butyl rubber is chlorinated butyl or brominated butyl rubber or mixtures thereof.

3. The composition of claim 1 wherein said olefin copolymer rubber is ethylene-propylene copolymer rubber or ethylene-propylene non-conjugated diolefin rubber or mixtures thereof.

4. The composition of claim 1 wherein said metal is zinc.

5. The composition of claim 1 wherein said crystalline polyolefin is polypropylene or propylene-ethylene copolymer.

6. The composition of claim 1 wherein said unsaturated carboxylic acid or derivative is maleic acid, maleic anhydride or endobicyclo-[2.2.1]-5-heptene-2,3-dicarboxylic anhydride.

7. The composition of claim 4 further comprising magnesium oxide.

8. The composition of claim 1 further comprising a softener.

9. The composition of claim 1 wherein component (A) is present at 20 to 70 parts by weight, component (B) is present at 30 to 80 parts by weight, component (C) is present at 10 to 50 parts by weight, component (D) is present at 5 to 50 parts by weight and optional component (E) is present at 5 to 30 parts by weight.

10. The composition of claim 1 wherein said crosslinking agent is present at 0.2 to 10 parts by weight per hundred parts by weight of components (A) through (E) inclusive.

11. The composition of claim 1 further comprising inorganic filler.

12. The composition of claim 1 wherein said olefin copolymer rubber is not substantially crosslinked.

13. The composition of claim 1 including said optional component (E).

14. A process for preparing a thermoplastic elastomer composition comprising (A) 10 to 90 parts by weight of crystalline polyolefin, (B) 10 to 90 parts by weight of halogenated butyl rubber, with the total amount of (A) and (B) being 100 parts by weight, (C) 10 to 120 parts by weight of olefin copolymer rubber composed of two or more monoolefins or two or more monoolefins and a non-conjugated diene, and (D) 1 to 90 parts by weight of modified polyolefin formed by reaction with an unsaturated carboxylic acid or a derivative thereof, and optionally (E) 2 to 50 parts by weight of nitrile rubber, wherein said components (A), (B), (C), (D) and when used (E), are brought into mixing contact with one another in the molten state and a crosslinking agent comprising a metal oxide and/or metal chloride is added to said components and mixing in the molten state is continued until at least partial crosslinking of said composition occurs.

15. The process of claim 14 wherein partial crosslinking occurs in component (B).

16. The process of claim 14 further comprising magnesium oxide.

17. The process of claim 14 further comprising a softener.

18. The process of claim 14 further comprising inorganic filler.

19. The process of claim 14 further comprising optional ingredient (E).

20. The process of claim 19 wherein component (A) is polypropylene or propylene-ethylene block copolymer, component (B) is chlorinated or brominated butyl rubber, component (C) is ethylene-propylene or ethylene-propylene non-conjugated diolefin rubber, component (D) is modified by reaction with an unsaturated carboxylic acid or a derivative thereof and said crosslinking agent metal is zinc.

21. The process of claim 14 wherein said cross-linking agent is present at 0.2 to 10 parts by weight per hundred parts by weight of components (A) through (E) inclusive.

22. The process of claim 20 including said optional component (E).

23. The composition of claim 1 wherein component (A) is polypropylene or propylene-ethylene copolymer, component (B) is chlorinated or brominated butyl rubber, component (C) is ethylene-propylene or ethylene-propylene non-conjugated diolefin rubber, component (D) is modified by reaction with an unsaturated carboxylic acid or a derivative thereof and said crosslinking agent metal is zinc.

24. The composition of claim 23 including said optional component (E).

UNITED STATES PATENT OFFICE
CERTIFICATE OF CORRECTION

Patent No. 4,728,692    Dated March 1, 1988

Inventor(s) E. Sezaki, T. Mikami, T. Kanai, T. Yoshida, K. Tanaka, M. Saito

It is certified that error appears in the above-identified patent and that said Letters Patent is hereby corrected as shown below:

PLEASE ADD:    Title page:

Assignee: Tonen Sekiyukagaku K.K., and
Exxon Chemical Patents Inc.

Signed and Sealed this

Twenty-third Day of January, 1990

Attest:

JEFFREY M. SAMUELS

Attesting Officer    Acting Commissioner of Patents and Trademarks